(12) United States Patent
Shimojo et al.

(10) Patent No.: US 10,598,974 B2
(45) Date of Patent: Mar. 24, 2020

(54) ON-VEHICLE DISPLAY DEVICE

(71) Applicant: ALPINE ELECTRONICS, INC., Ota-ku, Tokyo (JP)

(72) Inventors: Keiichi Shimojo, Iwaki (JP); Hiroshi Matsubuchi, Iwaki (JP)

(73) Assignee: ALPINE ELECTRONICS, INC., Tokyo (JP)

( * ) Notice: Subject to any disclaimer, the term of this patent is extended or adjusted under 35 U.S.C. 154(b) by 0 days.

(21) Appl. No.: 16/223,612

(22) Filed: Dec. 18, 2018

(65) Prior Publication Data

US 2019/0212605 A1    Jul. 11, 2019

(30) Foreign Application Priority Data

Jan. 10, 2018  (JP) ................. 2018-001868

(51) Int. Cl.
| | | |
|---|---|---|
| *G02F 1/1333* | (2006.01) | |
| *B60K 35/00* | (2006.01) | |
| *B60K 37/06* | (2006.01) | |
| *G06F 3/044* | (2006.01) | |
| *B60R 11/02* | (2006.01) | |

(52) U.S. Cl.
CPC ........ *G02F 1/133308* (2013.01); *B60K 35/00* (2013.01); *B60K 37/06* (2013.01); *G02F 1/13338* (2013.01); *B60K 2370/1438* (2019.05); *B60K 2370/688* (2019.05); *B60K 2370/693* (2019.05); *B60K 2370/695* (2019.05); *B60K 2370/816* (2019.05); *B60K 2370/91* (2019.05); *B60R 11/0235* (2013.01); *G02F 2001/133314* (2013.01); *G02F 2001/133331* (2013.01); *G02F 2202/28* (2013.01); *G02F 2203/01* (2013.01); *G06F 3/044* (2013.01)

(58) Field of Classification Search
CPC ... G02F 1/133308; G02F 2001/133314; G02F 2001/13332; B60K 2370/816; B60K 2370/81; B60K 2370/91; B60K 37/04
USPC ............ 349/58; 361/679.01, 679.02, 679.27, 361/697.29
See application file for complete search history.

(56) References Cited

U.S. PATENT DOCUMENTS

| | | | | |
|---|---|---|---|---|
| 5,905,550 | A * | 5/1999 | Ohgami | G02F 1/133308 349/58 |
| 2006/0012962 | A1 * | 1/2006 | Obata | H05K 5/02 361/704 |
| 2009/0190062 | A1 * | 7/2009 | Sudo | G02F 1/133308 349/58 |
| 2013/0077017 | A1 * | 3/2013 | Aoki | G02F 1/133308 349/58 |
| 2015/0022753 | A1 * | 1/2015 | Akatsuka | G02F 1/133308 349/58 |
| 2016/0187711 | A1 * | 6/2016 | Kida | G02F 1/13338 349/12 |

FOREIGN PATENT DOCUMENTS

JP    2016-122151    7/2016

* cited by examiner

*Primary Examiner* — Koosha Sharifi-Tafreshi
(74) *Attorney, Agent, or Firm* — Brinks Gilson & Lione

(57) ABSTRACT

An on-vehicle display device includes a fixed panel fixed to a vehicle body, a display unit, and a bracket that fixes the display unit to the fixed panel. In the display unit, the display cover plate is provided with an overhang which laterally overhangs from a display area, and the overhang has a back side supported by a support piece of the bracket without being fixed to the fixed panel.

17 Claims, 4 Drawing Sheets

ON-VEHICLE DISPLAY DEVICE

RELATED APPLICATION

The present application claims priority to Japanese Patent Application Number 2018-001868, filed Jan. 10, 2018, the entirety of which is hereby incorporated by reference.

BACKGROUND

1. Field of the Invention

The present invention relates to an on-vehicle display device in which a display cell is prevented from being directly affected by distortion of a fixed panel to reduce display unevenness in an image displayed by the display cell.

2. Description of the Related Art

An on-vehicle display device has a fixed panel incorporated in a dashboard, an instrument panel, or the like inside a passenger cabin, and a display unit including a display cell and a backlight unit is mounted to the fixed panel. Such a type of on-vehicle display device has a problem that display unevenness occurs due to generation of distortion in the display cell when a large fixing force acts on the display cell. In recent years, an IPS liquid crystal cell has been used to secure a wide viewing angle. However, when bending stress or torsional stress acts on the liquid crystal cell, black unevenness (brightness unevenness) is likely to occur as the display unevenness.

JP 2016-122151 A describes an on-vehicle display device in which fixing stress acting on a display cell is relaxed as a countermeasure for suppressing occurrence of display unevenness. FIG. 4 illustrates an on-vehicle display device having the same structure as that described in JP 2016-122151 A as a conventional example.

In an on-vehicle display device 100 of the conventional example illustrated in FIG. 4, a Z1 direction is a front side in the display direction, and a Z2 direction is the rear. The on-vehicle display device 100 has a fixed panel 110 fixed to a vehicle body, and the display unit 101 is installed inside a frame opening 110a of the fixed panel 110.

In the display unit 101, a display cell 102 and a backlight unit 103 are supported on a cell support member 104. A display cover plate 105 is installed in a front portion of the display cell 102 in a display direction (Z1 direction). In the on-vehicle display device 100 illustrated in FIG. 4, a bracket 111 made of a metal plate is fixed to the fixed panel 110, and the cell support member 104 of the display unit 101 is fixed to the bracket 111 via a fixing mechanism 115.

In the fixing mechanism 115 described in JP 2016-122151 A, an inner diameter of a mounting hole 115b is formed to be sufficiently larger than a diameter of a shaft portion of a fixing screw 115a such that the bracket 111 and the cell support member 104 can be fixed with freedom in the front-rear direction (Z direction) in the fixing mechanism 115. Further, a back surface of the display cover plate 105 is first fixed to a front surface of the fixed panel 110 via an adhesive layer 116 in a process of assembling the on-vehicle display device 100. Thereafter, the fixing screw 115a is tightened to the fixing mechanism 115 to fix the bracket 111 and the cell support member 104.

With this assembling method, it is possible to suppress a large fixing stress from acting on the cell support member 104 by a tightening force of the fixing screw 115a of the fixing mechanism 115.

Although the fixed panel 110 is formed using a synthetic resin material or the like in the on-vehicle display device 100 illustrated in FIG. 4, due to a dimensional tolerance between the fixed panel 110 and the vehicle body, distortion is easily applied to the fixed panel 110 when the fixed panel 110 is fixed to the vehicle body.

In the on-vehicle display device 100 described in JP 2016-122151 A, an overhang 105a overhanging laterally from the display cell 102 is provided on the display cover plate 105, and a back portion of the overhang 105a is attached and fixed to the fixed panel 110. Thus, when the distortion occurs at the time of fixing to the fixed panel 110, the distortion directly acts on the display cell 102 from the display cover plate 105 so that display unevenness is likely to occur on the display cell 102.

However, when the overhang 105a of the display cover plate 105 is not supported from the back portion but left in a free state, it is difficult to secure the fixing strength of the display cover plate 105. As a result, for example, when a sensor provided at a front portion of the display unit 101 is operated by pushing with a finger or the like, the display cover plate 105 is easily deformed, and the display unevenness is likely to occur as unnecessary stress acts on the display cell 102 due to such deformation.

SUMMARY

The present invention has been made to solve the above-described problems of the related art, and an object of the present disclosure is to provide an on-vehicle display device capable of reducing distortion to be applied to a display cell by firmly supporting an overhang of a display cover plate and preventing stress at the time of fixing a fixed panel to a vehicle body from directly acting on the display cover plate.

The present disclosure relates to an on-vehicle display device including: a display unit that includes a display cell and a cell support member supporting the display cell; and a fixed panel that supports the display unit and is installed in a vehicle body. The display unit is provided with a translucent display cover plate positioned on a front side, which is a display side of the display cell, and the display cover plate has an overhang that overhangs laterally from a display area of the display cell. A bracket to be fixed to the fixed panel is provided such that the overhang is not fixed to the fixed panel, but a back side of the overhang is supported by the bracket.

In the on-vehicle display device of the present disclosure, the back side of the overhang is attached to a cover support portion which is a part of the cell support member, and the back side of the cover support portion is attached to the bracket. Alternatively, the back side of the overhang is directly attached to the bracket in the on-vehicle display device of the present disclosure.

In the on-vehicle display device of the present disclosure, the fixed panel is made of a synthetic resin material and has an opening in which the display unit is accommodated.

In addition, the bracket is made of a metal plate in the on-vehicle display device of the present disclosure.

In the present disclosure, since the display cover plate provided on the display unit has the overhang extending laterally from the display area of the display cell, it is possible to improve the appearance by widening the area of the display cover plate. Moreover, since the back side of the overhang is supported by the bracket, warping of the display cover plate hardly occurs.

In addition, since the overhang of the display cover plate has the back side supported by the bracket without being fixed to the fixed panel, even if distortion caused by mounting to the vehicle body occurs on the fixed panel, it is

DETAILED DESCRIPTION OF THE PREFERRED EMBODIMENTS

Figure 1:
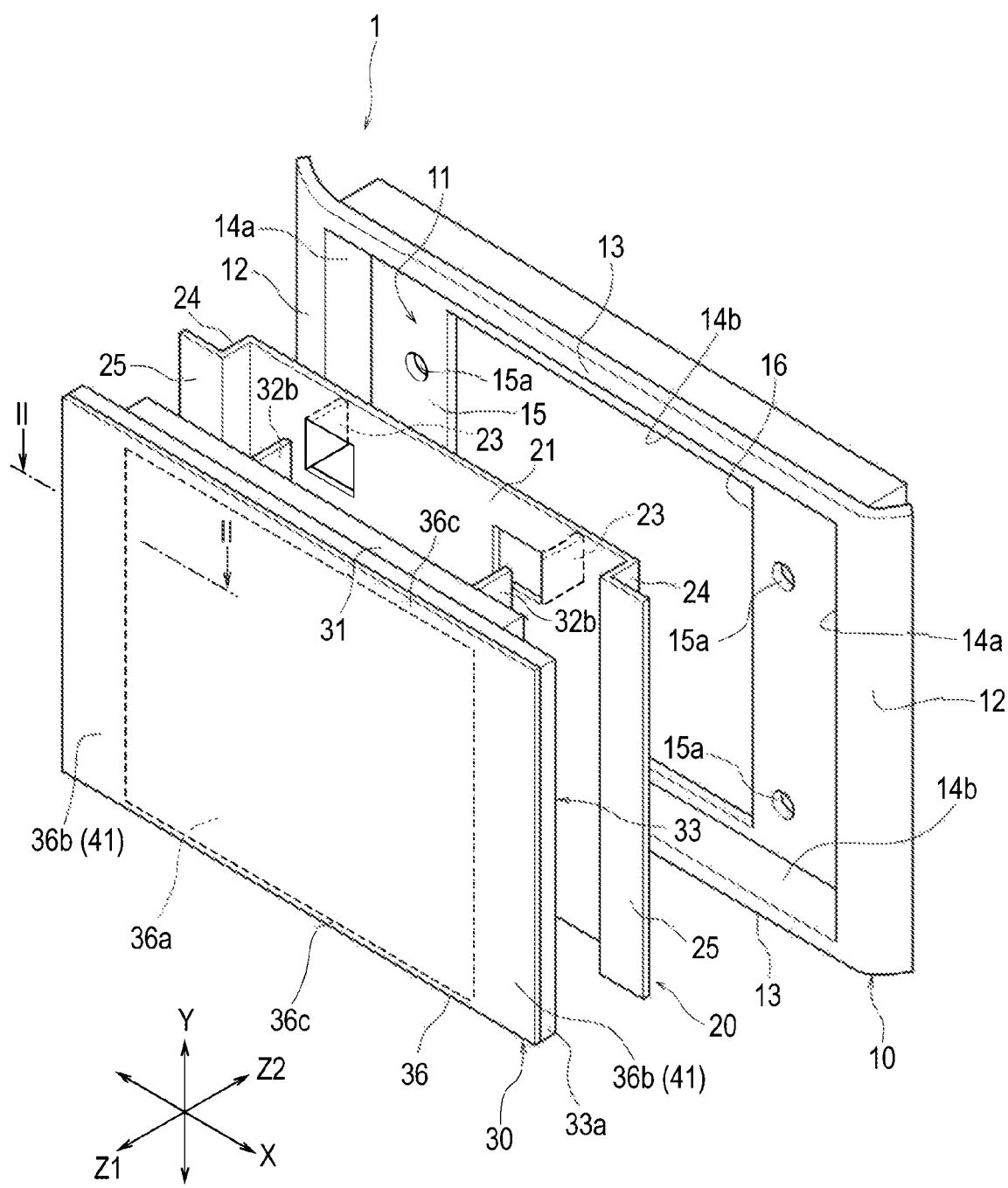
FIG. 1 is an exploded perspective view illustrating an on-vehicle display device according to a first embodiment of the present invention.

Hereinafter, embodiments will be described with reference to the accompanying drawings. Note that components having substantially the same functional configuration are denoted by the same reference numeral, and therefore, a redundant description thereof is omitted.

Figure 2:
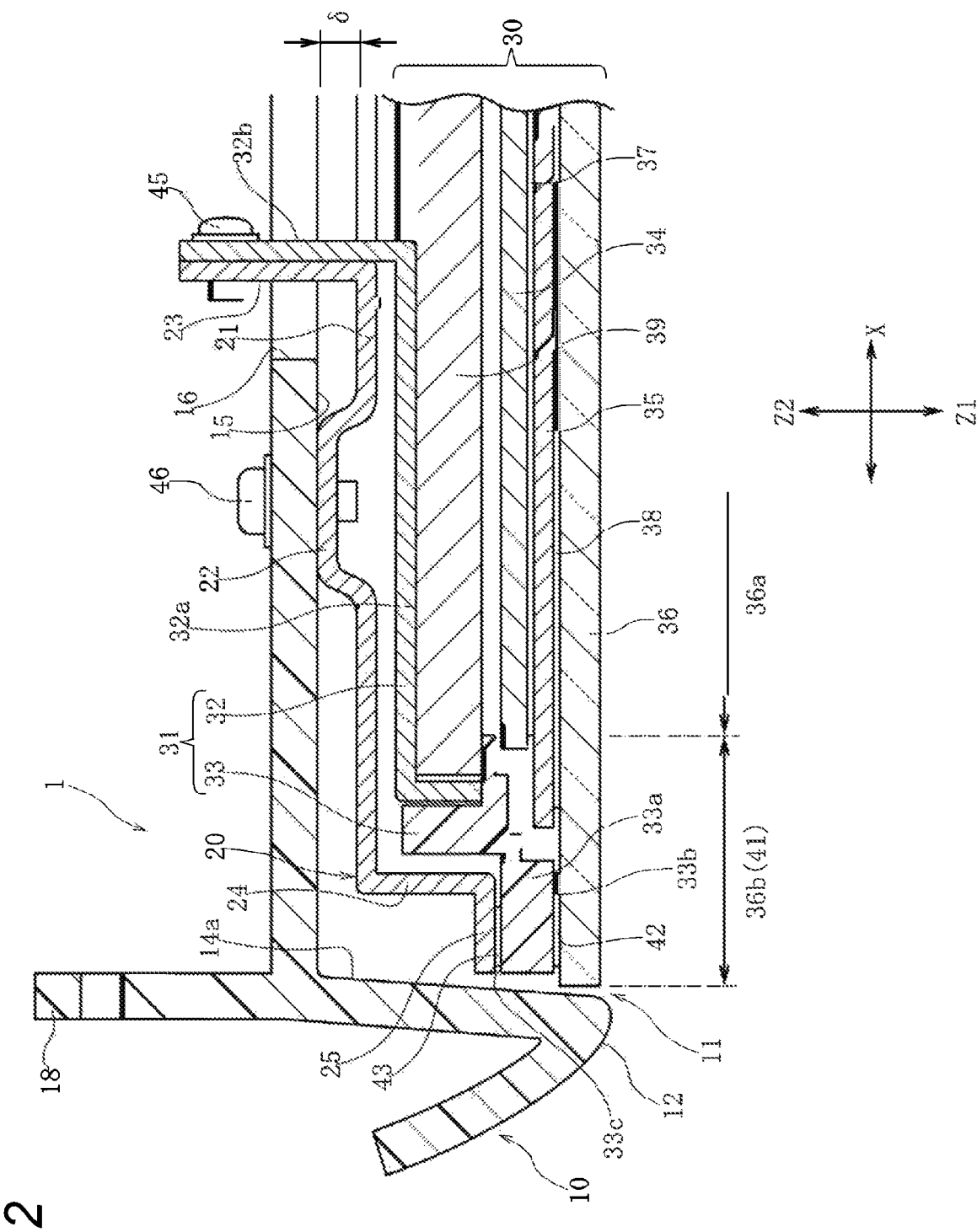
FIG. 2 is a partial cross-sectional view taken along the line II-II in a state where the on-vehicle display device of the first embodiment illustrated in FIG. 1 is assembled.

An on-vehicle display device 1 according to a first embodiment of the present invention illustrated in FIGS. 1 and 2 includes: a fixed panel 10 fixed to a vehicle, a display unit 30, and a bracket 20 configured to fix the display unit 30 to the fixed panel 10. In the on-vehicle display device 1, a Z1 direction indicates a front side or a front portion which is a display direction, a Z2 direction indicates a rear side or a back portion, an X direction indicates the lateral direction, and a Y direction indicates the upright direction.

The fixed panel 10 is formed by an injection molding method using a synthetic resin material or is formed by a die cast molding method using a light metal material. The fixed panel 10 is integrally formed with a vehicle mounting portion 18 extending to the rear side. The fixed panel 10 is incorporated in a dashboard or an instrument panel provided in a passenger cabin of an automobile, and the vehicle mounting portion 18 is screwed and fixed to the vehicle body.

As illustrated in FIGS. 1 and 2, the fixed panel 10 has a quadrangular frame opening 11 open toward the front side (Z1 direction). Lateral frame portions 12 are provided on both sides in the lateral direction (X direction) of the frame opening 11, and upright frame portions 13 are provided on both sides in the upright direction (Y direction) of the frame opening 11. As illustrated in the cross-sectional view of FIG. 2, the surface of the lateral frame portion 12 facing the Z1 direction has a curved surface shape that gradually retreats in the Z2 direction toward both sides in the lateral direction.

Laterally inner surfaces 14a and 14a opposing each other in the lateral direction and upright inner surfaces 14b and 14b opposing each other in the upright direction are formed inside the frame opening 11 of the fixed panel 10, and a bottom surface 15 continuous to the lateral inner surfaces 14a and 14a and the upright inner surfaces 14b and 14b is formed in the inside of the frame opening 11 in the Z2 direction. An opening 16 is formed in the bottom surface 15, and mounting holes 15a are provided at a plurality of positions.

The bracket 20 is formed using a metal plate such as a steel plate. The bracket 20 has a fixing plate portion 21. As illustrated in FIG. 2, the fixing plate portion 21 has a plurality of screw fixing portions 22 at positions opposing the mounting holes 15a. Each of the screw fixing portions 22 is drawn so as to protrude rearward (Z2 direction) from the fixing plate portion 21. A female screw portion is formed in the screw fixing portion 22. In addition, bracket-side connecting pieces 23 bent rearward (Z2 direction) are provided at a plurality of positions in the fixing plate portion 21.

The bracket 20 is formed with bent pieces 24 and 24 bent toward the front side from both sides in the lateral direction, and distal portions of the respective bent pieces 24 form support pieces 25 bent in the X direction. The support piece 25 is formed to be parallel to the X-Y plane. In the first embodiment, the support pieces 25 provided on both the sides in the lateral direction are continuous in the upright direction (Y direction), but the support pieces 25 may be provided at a plurality of places with a space in the upright direction.

As illustrated in FIGS. 1 and 2, the display unit 30 has a cell support member 31. As illustrated in FIG. 2, the cell support member 31 is made of a cell support holder 32 and a cell support frame member 33. The cell support holder 32 is formed using a metal plate such as aluminum, and has a box shape that is recessed in the Z1 direction. A holder-side connecting piece 32b bent rearward is provided at a plurality of places on a back plate 32a of the cell support holder 32 facing the Z2 side.

The cell support frame member 33 is formed using a synthetic resin material. The cell support frame member 33 is mounted to an outer circumferential portion of the cell support holder 32, and the cell support holder 32 and the cell support frame member 33 are fixed to each other by concavo-convex fitting. Alternatively, the cell support holder 32 and the cell support frame member 33 may be fixed to each other by a fixing screw.

The display unit 30 is provided with a display cell 34. A touch panel 35 is attached and fixed to a front portion of the display cell 34 via an optical adhesive 37, and a display cover plate 36 is attached and fixed to a front portion of the touch panel 35 by an optical adhesive 38.

In the display unit 30, a backlight unit 39 is provided with a space at the rear side of the display cell 34. The backlight unit 39 is provided with a light source such as an LED and a light guide member that applies light from the light source to the back surface of the display cell 34. The backlight unit 39 is fixed to the cell support holder 32 by means of adhesion, concavo-convex fitting, or the like.

The display cell 34 is a color liquid crystal display cell, and is a light-transmitting type in which a liquid crystal layer is interposed between light-transmitting substrates. The touch panel 35 is an electrostatic capacity sensor, and a translucent electrode such as ITO is formed on a translucent substrate such that it is possible to detect the approach of a finger or the like. The display cover plate 36 is translucent and is made of an acrylic plate.

As illustrated in FIG. 1, a rectangular area at the center of the display cover plate 36 is a display area 36a. An image displayed on a display screen of the display cell 34 is visible from the front side through the display area 36a. Both sides of the display area 36a in the lateral direction (X direction) are the lateral decoration areas 36b and 36b, and both sides of the display area 36a in the upright direction (Y direction) are the upright decoration areas 36c and 36c in the display cover plate 36. In the lateral decoration areas 36b and 36b and the upright decoration areas 36c and 36c, paint or the like is applied to a back surface of the display cover plate 36 facing the Z2 direction to serve as a non-transmissive region.

As illustrated in FIG. 2, an area including the lateral decoration area 36b is an overhang 41 that overhangs laterally from the display area 36a. As the overhang 41 is provided on the display cover plate 36, the area of the display cover plate 36 appearing on the front surface of the display unit 30 is widened, the appearance becomes favorable, and it is possible to provide a high-quality feeling. The overhang 41 in this specification is a portion which overhangs laterally from the display area 36a and is an area that coincides with a lateral decoration area 36b. Alternatively, the overhang 41 is an area that overhangs laterally to deviate from an area of the display cover plate 36 attached to the display cell 34 by the optical adhesive 37. Incidentally, the overhang 41 may be provided on both the sides in the upright direction (Y direction), or may be provided on both the sides in each of the lateral direction (X direction) and the upright direction (Y direction) of the display cover plate 36.

As illustrated in FIG. 2, a part of the cell support frame member 33, which is the cell support member 31, forms a cover support portion 33a. A surface 33b of the cover support portion 33a facing forward (Z1 direction) is a plane parallel to the XY plane. At least a part of the back portion (back surface) facing the Z2 direction in the overhang 41 (lateral decorating area 36b) of the display cover plate 36 is attached and fixed to the surface 33b of the cover support portion 33a by an adhesion layer 42. The adhesion layer 42 is a double-sided adhesive tape. Alternatively, the adhesion layer 42 may be a pressure-sensitive adhesive layer or an adhesive layer that does not use a tape.

As illustrated in FIG. 2, members in the three layers of the display cell 34, the touch panel 35, and the display cover plate 36 are integrally combined and fixed via the optical adhesives 37 and 38. The three-layer member is fixed to the bracket 20 by attaching the overhang 41 to the cover support portion 33a by the adhesion layer 42. However, the display cell 34 may be fixed to the cell support member 31 at a portion other than the adhesion layer 42 by means of adhesion.

As illustrated in FIG. 2, the bracket 20 is installed on the back portion of the display unit 30. Further, a back surface 33c of the cover support portion 33a facing the Z2 direction is attached and fixed to the support piece 25 of the bracket 20 by an adhesion layer 43. The adhesion layer 43 is a double-sided adhesive tape. Alternatively, the adhesion layer 43 may be a pressure-sensitive adhesive layer or an adhesive layer that does not use a tape. In the structure illustrated in FIG. 2, the overhang 41 of the display cover plate 36 is not fixed to the fixed panel 10, but has the back portion indirectly supported by the support piece 25 of the bracket 20 with the cover support portion 33a interposed therebetween.

As illustrated in FIG. 2, when the bracket 20 is installed on the back portion of the display unit 30, the holder-side connecting piece 32b bent from the cell support holder 32, which is the cell support member 31, overlaps with the bracket-side connecting piece 23 bent from the bracket 20. The holder-side connecting piece 32b and the bracket-side connecting piece 23 are fixed to each other by a connecting screw 45, and the display unit 30 is fixed to the bracket 20. As illustrated in FIG. 2, the holder-side connecting piece 32b and the bracket-side connecting piece 23 extend rearward (in the Z2 direction) by passing through the opening 16 of the fixed panel 10.

In a process of mounting the on-vehicle display device 1 to the vehicle body, first, the display unit 30 and the bracket 20 are installed inside the frame opening 11 of the fixed panel 10 in a state where the display unit 30 is fixed to the bracket 20. As illustrated in FIG. 2, the screw fixing portion 22 formed on the fixing plate portion 21 of the bracket 20 abuts against the bottom surface 15 of the frame opening 11 of the fixed panel 10, and the fixing screw 46 inserted into the mounting hole 15a open to the bottom surface 15 is screwed into a female screw hole formed in the screw fixing portion 22. As a result, the fixing plate portion 21 of the bracket 20 is fixed to the fixed panel 10.

Next, the fixed panel 10 holding the display unit 30 and the fixed bracket 20 is installed on the dashboard or the instrument panel, and the vehicle mounting portion 18 of the fixed panel 10 is fixed to the frame portion or the like of the vehicle body by means of screwing or fitting.

Incidentally, in the process of mounting the on-vehicle display device 1 to the vehicle body, the fixed panel 10 may be first fixed to a part of the vehicle body by means of screwing or fitting, and then the display unit 30 and the bracket 20 may be installed inside the frame opening 11 of the fixed panel 10 in the state of being fixed to each other, and the bracket 20 may be fixed to the fixed panel 10 with the fixing screw 46.

Figure 4:
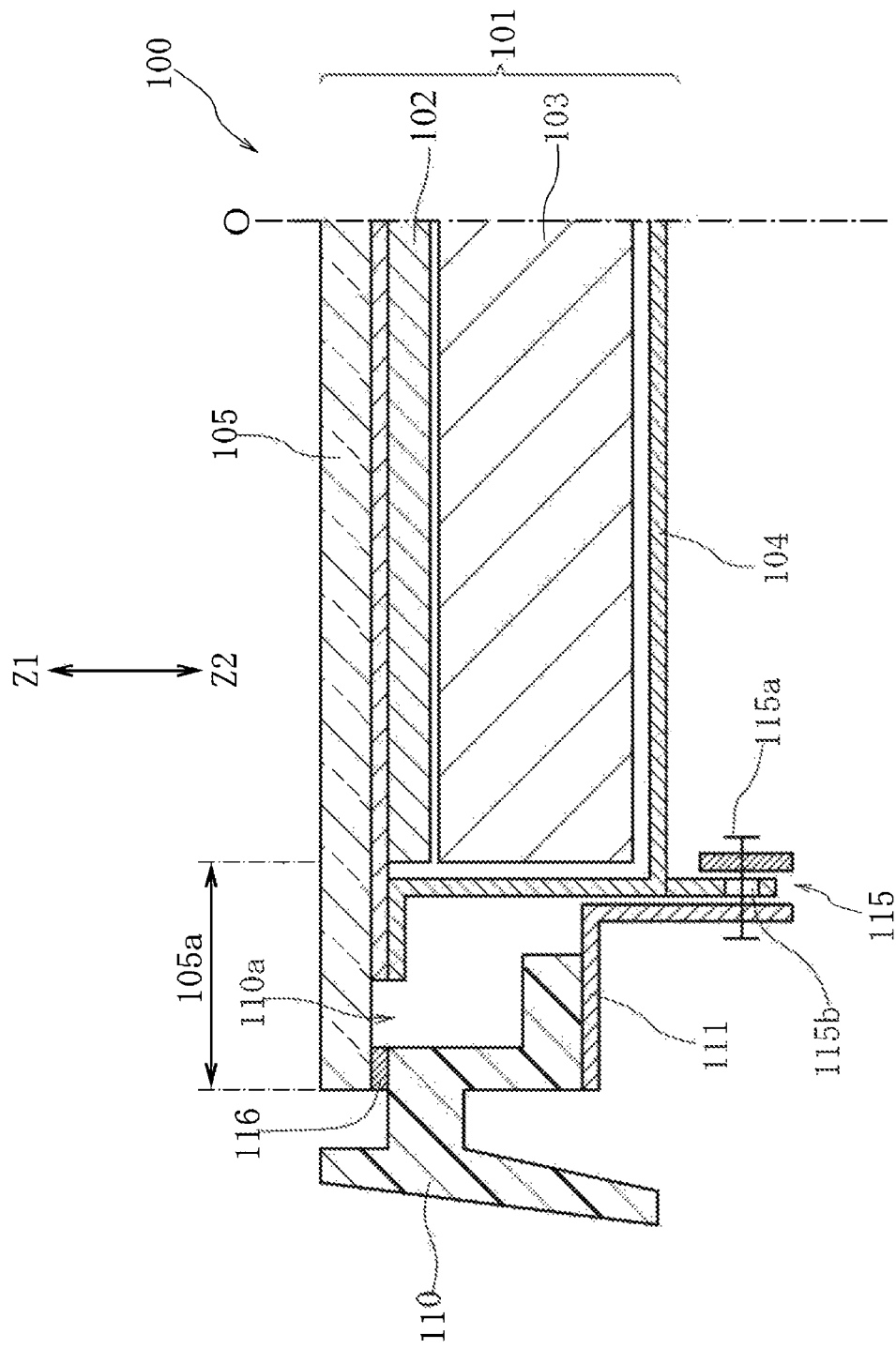
FIG. 4 is a partial cross-sectional view illustrating an on-vehicle display device of a conventional example.

In the on-vehicle display device 1 of the first embodiment, the display unit 30 is fixed to the bracket 20, the bracket 20 is fixed to the fixed panel 10, and the overhang 41 of the display cover plate 36 is not fixed to the fixed panel 10, which is different from the conventional example illustrated in FIG. 4. When the fixed panel 10 is fixed to the vehicle body, distortion is likely to be applied to the fixed panel 10, and further, a dimensional error is likely to occur due to sink or the like during curing of a resin material even at the time of molding the fixed panel 10. However, since the overhang 41 of the display cover plate 36 is not fixed to the fixed panel 10, the distortion occurring in the fixed panel 10 does not directly act on the display cover plate 36, and the distortion and stress hardly act on the display cell 34.

It is preferable to use an IPS system as the display cell 34 that can secure a wide viewing angle. However, black unevenness (brightness unevenness) is likely to occur as display unevenness in the display cell of the IPS system when the distortion is applied. However, the distortion occurring in the fixed panel 10 does not directly act on the display cover plate 36 in the on-vehicle display device 1 illustrated in FIGS. 1 and 2, and thus, the black unevenness can be suppressed even when the display cell of the IPS system is used.

As illustrated in FIG. 2, the screw fixing portion 22, which is drawn so as to protrude rearward (Z2 direction), is formed in the fixing plate portion 21 of the bracket 20, and the screw fixing portion 22 abuts against the bottom surface 15 of the frame opening 11 of the fixed panel 10 to be fixed by the fixing screw 46. Further, a gap 6 is formed between the fixing plate portion 21 of the bracket 20 and the bottom surface 15 of the fixed panel 10 in a portion other than the screw fixing portion 22. Thus, the distortion applied to the fixed panel 10 is hardly transmitted to the bracket 20, and stress is hardly transmitted from the bracket 20 to the display cover plate 36.

In the display unit 30, the back portion of the overhang 41 of the display cover plate 36 is attached to the cover support portion 33a of the cell support frame member 33 via the adhesion layer 42, and the back surface 33c of the cover support portion 33a is attached to the support piece 25 of the bracket 20 by the adhesion layer 43. Since the back portions of the overhangs 41 positioned on both the sides of the display cover plate 36 are supported by the cover support portion 33a and the support piece 25, the surface rigidity is high and the display cover plate 36 is hardly deformed. In particular, the bracket 20 is made of a steel plate, and the bending rigidity of the bracket 20 is made higher than that of the cell support holder 32 so that the overhang 41 of the display cover plate 36 can be firmly supported, and the display cover plate 36 is hardly deformed.

In the on-vehicle display device 1, a display image of the display cell 34 is clearly displayed in the display area 36a when the display cell 34 operates and the backlight unit 39 operates. When an operator touches a finger on the front surface of the display cover plate 36 while viewing the display image of the display area 36a, such a touch position is detected by the touch panel 35. At this time, even if the display cover plate 36 is pushed relatively strongly with the finger, the back portion of the overhang 41 is firmly supported by the cover support portion 33a of the cell support frame member 33 and the support piece 25 of the bracket 20, and thus, the display cover plate 36 is hardly deformed. Accordingly, even when the operation of touching the display cover plate 36 with the finger is performed, the distortion is hardly applied to the display cell 34, and the black unevenness hardly occurs in the display image.

Next, an on-vehicle display device 51 according to a second embodiment of the present invention illustrated in FIG. 3 will be described.

Figure 3:
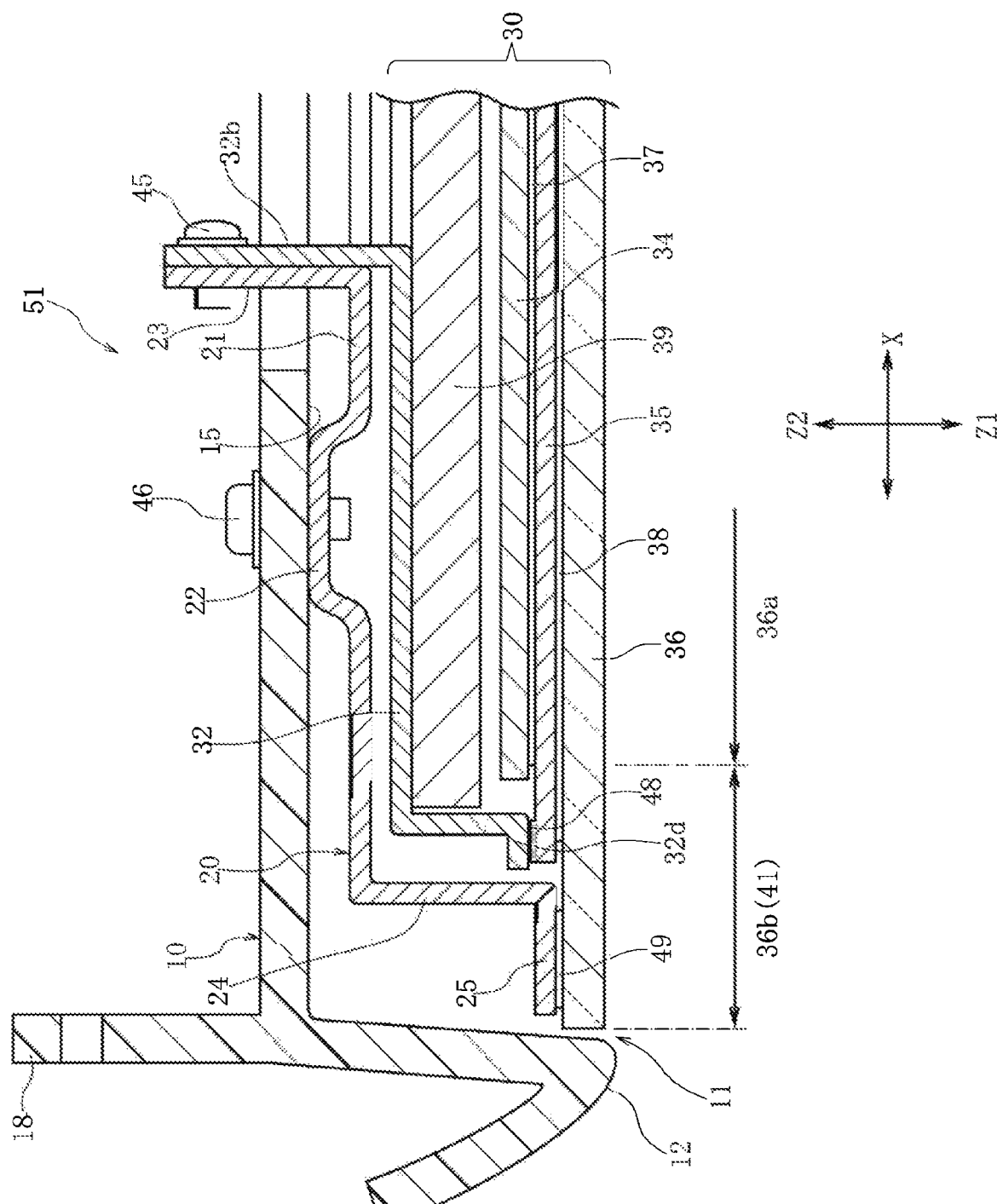
FIG. 3 is a partial cross-sectional view, equivalent to FIG. 2, illustrating an on-vehicle display device according to a second embodiment of the present invention.

In the second embodiment of FIG. 3, the same portions as those of the first embodiment illustrated in FIG. 2 will be denoted by the same reference signs, and a detailed description thereof will be omitted.

In the display unit 30 of the on-vehicle display device 51 illustrated in FIG. 3, a cell support member is configured only using the cell support holder 32, and the cell support frame member 33 illustrated in FIG. 2 is not provided. A cell fixing piece 32d is formed on the cell support holder 32, and at least one member of the display cell 34, the touch panel 35, and the display cover plate 36 is fixed to the cell fixing piece 32d. In the embodiment illustrated in FIG. 3, a back portion of the touch panel 35 is fixed to the cell fixing piece 32d via an adhesion layer 48. The adhesion layer 48 is, for example, a double-sided adhesive tape.

The support piece 25 provided on the bracket 20 is positioned further forward (Z1 direction) as compared to the first embodiment illustrated in FIG. 2. Further, a back portion of the overhang 41 of the display cover plate 36 is fixed to the support piece 25 via an adhesion layer 49.

Since the overhang 41 of the display cover plate 36 is not fixed to the fixed panel 10 in the on-vehicle display device 51 of the second embodiment, distortion at the time of mounting the fixed panel 10 to a vehicle body or the like does not directly act on the display cover plate 36 and the display cell 34. In addition, since the back portion of the overhang 41 is supported by the bracket 20, the display cover plate 36 is firmly fixed, and the display cover plate 36 is hardly deformed when the display cover plate 36 is operated with a finger.

Even when the liquid crystal display cell of the IPS system is used as the display cell 34 in the on-vehicle display device of the present invention, the black unevenness (brightness unevenness) as the display unevenness hardly occurs. However, the display cell 34 of the present invention may be a liquid crystal display cell other than the IPS system, and may be an EL display cell or the like.

While there has been illustrated and described what is at present contemplated to be preferred embodiments of the present invention, it will be understood by those skilled in the art that various changes and modifications may be made, and equivalents may be substituted for elements thereof without departing from the true scope of the invention. In addition, many modifications may be made to adapt a particular situation to the teachings of the invention without departing from the central scope thereof. Therefore, it is intended that this invention not be limited to the particular embodiments disclosed, but that the invention will include all embodiments falling within the scope of the appended claims.

What is claimed is:

1. An on-vehicle display device comprising:
   a display unit that includes a display cell and a cell support member supporting the display cell; and
   a fixed panel that supports the display unit and is configured to be installed on a vehicle body,
   wherein the display unit is provided with a translucent display cover plate positioned on a front side, which is a display side of the display cell,
   the display cover plate has an overhang that overhangs from a display area of the display cell, and
   a bracket to be fixed to the fixed panel at a first location on the bracket is provided such that the overhang is not fixed to the fixed panel but a back side of the overhang is supported by the bracket at a second location on the bracket that is offset from the first location on the bracket.

2. The on-vehicle display device according to claim 1, wherein
   which is a part of the cell support member, and the back side of the cover support portion is attached to the bracket.

3. The on-vehicle display device according to claim 1, wherein
   the back side of the overhang is directly attached to the bracket.

4. The on-vehicle display device according to claim 1, wherein
   the fixed panel is made of a synthetic resin material and has an opening in which the display unit is accommodated.

5. The on-vehicle display device according to claim 4, wherein
   the bracket is made of a metal plate.

6. The on-vehicle device according to claim 2, wherein
   the cover support portion comprises a synthetic resin material.

7. The on-vehicle device according to claim 6, wherein
   the overhang is attached to the cover support portion using adhesive tape.

8. The on-vehicle device according to claim 2, wherein
   a location at which the overhang is attached to the cover support portion is offset from a location at which the cover support portion is attached to the bracket.

9. The on-vehicle device according to claim 1, wherein
   the overhang of the display cover plate overhangs laterally from the display area of the display cell.

10. An on-vehicle display device comprising:
    a display unit that includes a display cell and a cell support member supporting the display cell; and
    a fixed panel that supports the display unit and is configured to be installed on a vehicle body,
    wherein the display unit is provided with a touch panel positioned on a front side, which is a display side of the display cell, and the cell support member is fixed to a back side of at least one of the display cell and the touch panel; and
    wherein a location at which the at least one of the display cell and the touch panel is attached to the cell support member is offset from a location at which the cell support member is attached to the fixed panel.

11. The on-vehicle display device according to claim 10, wherein
the display unit is further provided with a translucent display cover plate positioned on a front side of the touch panel,
the display cover plate has an overhang that overhangs from a display area of the display cell, and
a bracket to be fixed to the fixed panel is provided such that the overhang is not fixed to the fixed panel but a back side of the overhang is supported by the bracket.

12. The on-vehicle display device according to claim 11, wherein
the back side of the overhang is attached to the bracket using an adhesion layer.

13. The on-vehicle display device according to claim 10, wherein
the fixed panel is made of a synthetic resin material and has an opening in which the display unit is accommodated.

14. The on-vehicle display device according to claim 11, wherein
the bracket is made of a metal plate.

15. The on-vehicle device according to claim 10, wherein the cell support member is made of a metal plate.

16. The on-vehicle device according to claim 10, wherein the at least one of the display cell and the touch panel is attached to the cell support member using an adhesion layer.

17. The on-vehicle device according to claim 11, wherein the overhang of the display cover plate overhangs laterally from the display area of the display cell.

* * * * *

UNITED STATES PATENT AND TRADEMARK OFFICE
CERTIFICATE OF CORRECTION

PATENT NO. : 10,598,974 B2  
APPLICATION NO. : 16/223612  
DATED : March 24, 2020  
INVENTOR(S) : Keiichi Shimojo et al.

Page 1 of 1

It is certified that error appears in the above-identified patent and that said Letters Patent is hereby corrected as shown below:

In the Claims

In Column 8, Claim 2, Line 27 after "wherein", insert --the back side of the overhang is attached to a cover support portion--.

Signed and Sealed this  
Sixteenth Day of June, 2020

Andrei Iancu  
*Director of the United States Patent and Trademark Office*